United States Patent
Chiu et al.

(10) Patent No.: US 9,471,212 B2
(45) Date of Patent: Oct. 18, 2016

(54) REMINDER GENERATING METHOD AND A MOBILE ELECTRONIC DEVICE USING THE SAME

(71) Applicant: HTC Corporation, Taoyuan County (TW)

(72) Inventors: Kai-Feng Chiu, Taoyuan County (TW); Cheng-Hang Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 268 days.

(21) Appl. No.: 14/201,929

(22) Filed: Mar. 10, 2014

(65) Prior Publication Data
US 2015/0253973 A1 Sep. 10, 2015

(51) Int. Cl.
| | |
|---|---|
| *G06F 3/048* | (2013.01) |
| *G06F 3/0484* | (2013.01) |
| *H04L 12/58* | (2006.01) |
| *H04L 12/18* | (2006.01) |
| *H04M 1/725* | (2006.01) |
| *H04M 3/42* | (2006.01) |
| *H04M 1/656* | (2006.01) |

(52) U.S. Cl.
CPC ....... *G06F 3/04847* (2013.01); *G06F 3/04842* (2013.01); *H04L 12/1895* (2013.01); *H04L 51/02* (2013.01); *H04L 51/046* (2013.01); *H04M 1/72519* (2013.01); *H04M 1/72566* (2013.01); *H04M 1/656* (2013.01); *H04M 1/72552* (2013.01); *H04M 3/42382* (2013.01)

(58) Field of Classification Search
CPC ....... G06F 3/16–3/167; G06F 3/048–3/04883
See application file for complete search history.

(56) References Cited

U.S. PATENT DOCUMENTS

| | | | | |
|---|---|---|---|---|
| 2011/0060591 A1* | 3/2011 | Chanvez | ............. | H04M 3/2281 704/270 |
| 2012/0035925 A1* | 2/2012 | Friend | ..................... | G06F 3/167 704/235 |

FOREIGN PATENT DOCUMENTS

| | | |
|---|---|---|
| CN | 103325031 | 9/2013 |
| CN | 103354575 | 10/2013 |
| TW | M397560 | 2/2011 |
| TW | M422120 | 2/2012 |
| WO | 2013174092 | 11/2013 |

OTHER PUBLICATIONS

"Office Action of Taiwan Counterpart Application", issued on Nov. 2, 2015, p. 1-p. 9, in which the listed references were cited.

* cited by examiner

*Primary Examiner* — Claudia Dragoescu
(74) *Attorney, Agent, or Firm* — Jianq Chyun IP Office (57) ABSTRACT

The present disclosure proposes a reminder generating method and a mobile electronic device using the same method. In one of the exemplary embodiments, the mobile electronic device would include a display and a processor coupled to the display and is configured for displaying a first user interface of an application on a display of the mobile electronic device, converting a data source into a data stream by using the first application, receiving a keyword extracted from the data stream, analyzing the keyword to generate within the first user interface a second user interface which includes at least a first information based on the keyword, and storing the first information after the first information has been confirmed and established by the user.

18 Claims, 6 Drawing Sheets

REMINDER GENERATING METHOD AND A MOBILE ELECTRONIC DEVICE USING THE SAME

TECHNICAL FIELD

The present disclosure proposes a reminder generating method and a mobile electronic device using the same method.

BACKGROUND

A handheld mobile electronic device such as a smart phone has become multi-purpose as data processing, personal organizing, entertainment, and communication functions are combined into one portable pocket sized computer. The versatility of a mobile electronic device has enable users to explore an increasing variety of applications. Currently, new applications are constantly being developed by various smart phone vendors or independent developers to provide new uses or to enhance existing applications. A mobile electronic device could obtain applications or programs by methods such as by searching or browsing through an online store or a market place. These applications could be downloaded by a user and be used upon installation into one's device instantly. A mobile electronic device could also gain access to an application hosted on another server through a public or a private network.

One recently develop application is a voice assistant such as Google Now which uses a natural language user interface to answer questions, make recommendations, and perform actions by delegating requests to a set of web services. Along with answering user-initiated queries, a voice assistant could passively deliver information to users upon making predictions based on the search habit of users. A voice assistant could also uses the natural language user interface to make recommendations and to perform certain capabilities of the electronic device including opening applications, using certain applications, making updates and data entry in social network websites, multitasking among different applications, and etc. . . .

However, at this point in time, an application such as the aforementioned voice assistant has not been integrated into an actual voice conversation. In particular, during a conversation between two users or involving multiple users, whenever someone says something that needs to be recorded or written down, there is currently no convenient way for a user to do so. For example, if a conversation involves a date and time or an address which needs to be written down, but a user does not have a pen or a piece of paper handy or is not in a position to write things down, such information could be lost unless the user possesses a keen memory. Also currently, there is no known method which interfaces between a live phone call and other applications such as a phone directory, a calendar application, messaging applications, and so forth.

Therefore, there would be a need for a method and a mobile electronic device using the same method to generate from a conversational data source a reminder which could be saved and used at a later time.

SUMMARY OF THE DISCLOSURE

Accordingly, the present disclosure is directed to a reminder generating method and a mobile electronic device using the same method.

The proposed reminder generating method would be used by a mobile electronic device, and the method would includes steps at least but not limited to displaying a first user interface of an application on a display of the mobile electronic device. The application would obtain a data source from which a keyword set would be extracted from directly or indirectly. The data source could be one of a recorded phone conversation, a live phone conversation, a text message, an instant message, an email, a social network message, and a note custom created by a user. The keyword set would be analyzed in order to generate a first information based on the keyword set, and the first information would be display in a second user interface of the application, wherein the second user interface could be displayed within the first user interface. After displaying the first information in the second user interface, the first information would be stored.

The proposed mobile electronic device would include at least but not limited to a display, a storage medium, and a processor coupled to the display and the storage medium. The processor would be configured for displaying on the display a first user interface of the application which would obtain a data source from which a keyword set would be extracted directly or indirectly. The data source could be one of a recorded phone conversation, a live phone conversation, a text message, an instant message, an email, a social network message, and a note custom created by a user. The keyword set would be analyzed by the processor to generate a first information based on the keyword set to be displayed in a second user interface of the application, wherein the second user interface could be displayed within the first user interface. After displaying the first information in the second user interface, the first information would be stored.

According to one of the exemplary embodiments, the proposed mobile electronic device could further include a wireless transceiver, and if the data source is a live voice conversation, after displaying the first application, the processor would further be configured for establishing through the wireless transceiver a first voice conversation after displaying the voice conversation interface, and the first information would be stored after the first voice conversation has been terminated.

According to one of the exemplary embodiments, the processor of the mobile electronic device would further be configured for editing the first information on a third user interface displayed on the display before the first information is stored, wherein the third user interface would belong to the application and could be displayed within or outside the first user interface.

According to one of the exemplary embodiments, the processor of the mobile electronic device would further be configured for establishing through the wireless transceiver a second voice conversation with the same device as the first voice conversation; and in response to the second voice conversation being established, a fourth user interface of the application would be displayed, and the fourth user interface would show the same first information on the display.

According to one of the exemplary embodiments, the processor of the mobile electronic device would further be configured for receiving another keyword set extracted from the data stream; analyzing the another keyword set to generate within the first user interface a fifth user interface of the application, and the fifth user interface would display a second information based on the another keyword set. The second information would then be stored in the storage medium.

According to one of the exemplary embodiments, if the second user interface is a contact person user interface, the processor would then further be configured for activating a software button of the contact person user interface to open a text message editing user interface, and a text message would be sent through the wireless transceiver from the text message editing user interface.

According to one of the exemplary embodiments, the processor of the mobile electronic device would further be configured for making a phone call through the wireless transceiver from the contact person user interface displayed on the display.

According to one of the exemplary embodiments, in response to obtaining a data source by using the application displayed on the display, the processor of the mobile electronic device would further be configured for converting the data source into a bit stream, transmitting through the wireless transceiver the bit stream to an external server via a network. The bit stream would be analyzed by the external server which would then return a keyword set. The keyword set would then be received by the mobile electronic device through the transceiver.

According to one of the exemplary embodiments, the processor of the mobile electronic device would further includes a voice analyzing module, and in response to the processor obtaining a data source by using the application displayed on the display, the processor would further be configured for converting the data source into a bit stream, transmitting the bit stream to the voice analyzing module, and receiving the keyword set from the voice analyzing module.

The present disclosure also proposes a non-transitory storage medium configured to store a plurality of computer readable programming codes to be loaded into a mobile electronic device to execute functions. The functions would include at least but not limited to displaying a first user interface of an application on a display of the mobile electronic device. The application would obtain a data source from which a keyword set would be extracted from directly or indirectly. The data source could be one of a recorded phone conversation, a live phone conversation, a text message, an instant message, an email, a social network message, and a note custom created by a user. The keyword set would be analyzed in order to generate a first information based on the keyword set, and the first information would be display in a second user interface of the application, wherein the second user interface could be displayed within the first user interface. After displaying the first information in the second user interface, the first information would be stored.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the present exemplary embodiments of the disclosure, examples of which are illustrated in the accompanying drawings. Wherever possible, the same reference numbers are used in the drawings and the description to refer to the same or like parts.

As described briefly in the background section, there is currently no known method to automatically take notes and to organize important data from a conversational data source to a reminder generating device which could be imported to other applications and be synchronized among users. Therefore, the present disclosure proposes a method and a mobile electronic device using the same method to extract certain key word set and key phrase which would be collected as not only as notes to be take but could be imported into other functions or applications to be organized and stored later. For example, suppose that a user established a phone call with another user, based on the phone conversation, the mobile electronic device would derive certain key information to be saved into a contact person list and/or a calendar event. The key information could be edited by the user any time after it has been obtained and organized from the conversation and then would eventually be saved into a native storage device of the mobile electronic device. It should be noted that a key word set in this disclosure would include one or more words which may or may not be consecutive.

Figure 1:
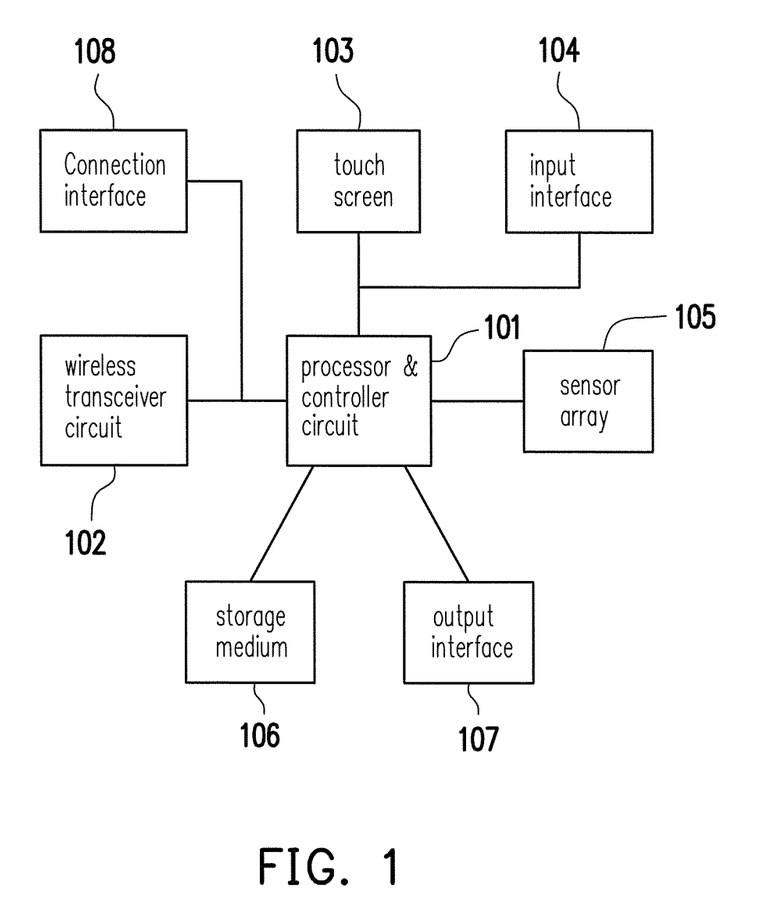
FIG. 1 illustrates a proposed mobile electronic device in accordance with one of the exemplary embodiments of the present disclosure.

FIG. 1 illustrates a proposed mobile electronic device in accordance with one of the exemplary embodiments of the present disclosure. An exemplary mobile electronic device could be a smart phone, a mobile phone, a person digital assistant (PDA), a tablet, a notebook computer, and so forth.

The exemplary mobile electronic device of FIG. 1 would include a processor and controller circuit 101. The processor and controller circuit 101 would be electrically coupled to at least but not limited to a wireless transmitter and receiver (transceiver) 102, a touch screen 103, an input unit 104, a sensor array 105, a storage medium 106, an output interface 107, and a connection interface 108.

The processor and controller circuit 101 may include one or more of a micro-controller, a North Bridge, a South Bridge, a field programmable array (FPGA), a programmable logic device (PLD), an application specific integrated circuit (ASIC), or other similar device, or a combination thereof. The processor and controller circuit 101 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing tasks of the exemplary mobile electronic device and would execute functions related to the proposed method of the present disclosure such as FIG. 2~FIG. 8 and their corresponding written descriptions.

The transceiver circuit 102 could be components such as a protocol unit which support signal transmissions of a global system for mobile communication (GSM), a personal handy-phone system (PHS), a code division multiple access (CDMA) system, a wireless fidelity (Wi-Fi) system or a worldwide interoperability for microwave access (Wi-MAX). The transceiver circuit 102 would also provide wireless access for the mobile electronic device 101 by including components at least but not limited to a transmitter circuit, a receiver circuit, an analog-to-digital (A/D) converter, a digital-to-analog (D/A) converter, a low noise amplifier (LNA), mixers, filters, matching networks, transmission lines, a power amplifier (PA), one or more antenna units, and a local storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The touch screen 103 may contain a display such as a liquid crystal display (LCD), a light-emitting diode (LED) display, a field emission display (FED) or other types of display. The input interface 104 could be, for example, an input device such as a mouse, a keyboard, a joystick, a wheel, and so forth and would receive an input operation from a user. The input interface 104 may also include a resistive, a capacitive or other types of touch sensing device which would be integrated as a part of the touch screen 103.

The sensor array 105 may contain various sensors such as at least one or more of a G-sensor, a gyroscope, a motion sensor, a proximity sensor, a temperature sensor, and so forth.

The connection interface 108 could be, for example, a cable interface such as a universal serial bus (USB) or a wireless interface such as Bluetooth. The connection interface 108 could be a serial interface such as RS232 interface or could be a parallel interface such as USB or Firewire.

The storage medium 106 could include various forms of non-transitory, volatile, and non-volatile memories which would store buffered or permanent data such as compiled programming codes used to execute functions of the exemplary mobile electronic device. The output interface 107 would include at least but not limited to a speaker, a vibrating oscillator, and one or more light emitting diodes (LED).

It should be noted that the blocks 101~108 are mere exemplary and do not constitute as limitations as it is well within the capability of an ordinary person skilled in the art to add, subtract, or merge certain blocks or to alter the interconnections among these blocks.

Figure 2:
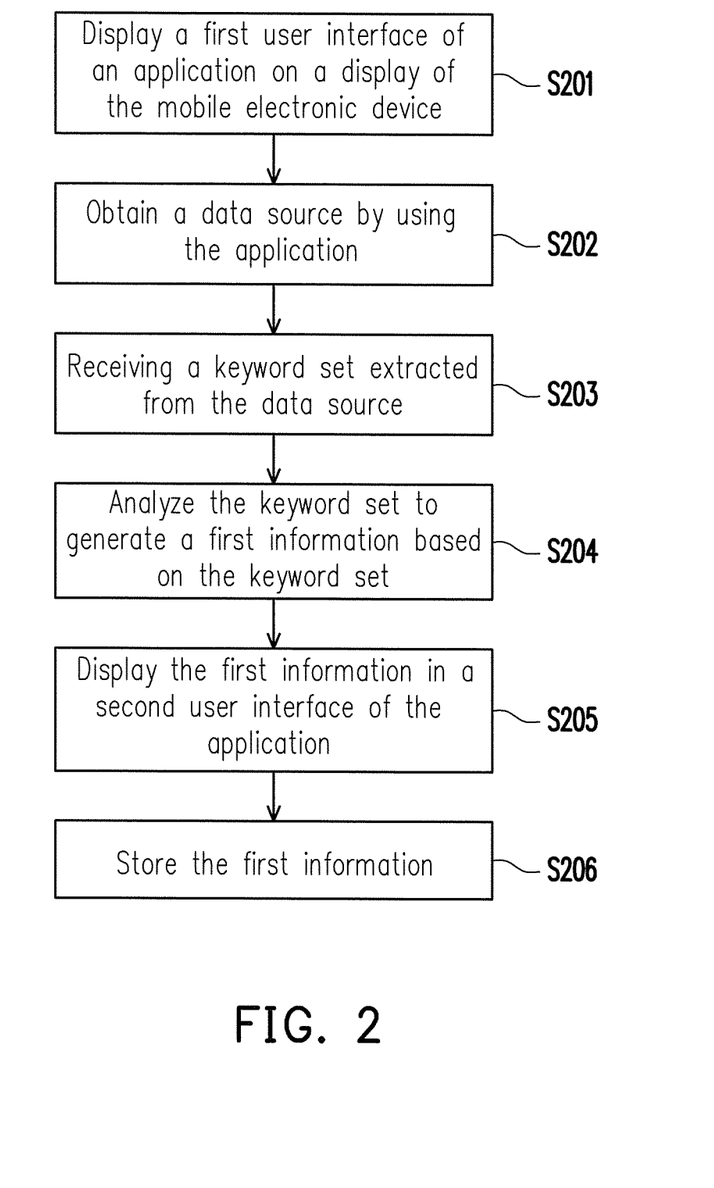
FIG. 2 illustrates a proposed reminder generating method in accordance with one of the exemplary embodiments of the present disclosure.

FIG. 2 illustrates a proposed reminder generating method in accordance with one of the exemplary embodiments of the present disclosure. The steps of FIG. 2 could be implemented by the proposed mobile electronic device assisted by a processor (e.g. 101) within said device. In step S201, the proposed mobile electronic device displays a first user interface of an application on a display (e.g. 103) of the mobile electronic device. The display of the first user interface could be triggered by an event such as receiving a phone call through a wireless transceiver interface (e.g. 102) or receiving a text message. In the case of a phone call, a phone call application would be triggered by the phone call and would display a first user interface which may include a caller's information and buttons (e.g. 104) to whether accept or decline the phone call. In step S202, the application which was triggered by an incoming data source would obtain the data source (e.g. a recorded phone conversation in a digital form). The recorded phone conversation would then be delivered to a voice analyzer which could be situated at a remote location or embedded natively to the mobile electronic device. The data source could be one of a recorded phone conversation, a live phone conversation, a text message, an instant message, an email, a social network message, and a note custom created by a user. The voice analyzer could be a voice assistant (e.g. Voice Smart or VoS).

In the case when the voice analyzer is situated at a remote location, upon the establishment of the phone conversation, the mobile electronic device would then establish a connection using a wireless transceiver circuit (e.g. 102) or a connection interface (e.g. 108) through a network with a server which hosts the voice analyzer, and the mobile electronic device would deliver the phone conversation in digital form to the server. After analysis has been performed, the server would transmit to the mobile electronic device one or more keyword sets or phrases.

In step S203, the proposed mobile electronic device would receive a keyword set extracted from the data source by the analyzer. The a keyword set may include a person's name, a user identification, a phone number, a location, a time, a date, an address, an event (e.g. shopping, sports, party, meeting, anniversary, celebration, graduation, interview, doctor appointment, and etc. . . . ), a business name, items associated with an event (e.g. what to bring to party, what to wear for an occasion, and etc. . . . ). According to one exemplary embodiment, the voice analyzer could analyze each word from the data source such as a phone conversation and an email and compare each word with a data base. When one or more matches are found, the voice analyzer could determine a keyword set based on relevance relative to the whole conversation. It should be noted that the exact implementation of the voice analyzer would not be limiting since it could be based on various techniques which would be beyond the scope of the specification.

In step S204, the proposed mobile electronic device would analyze a received keyword set to generate a first information based on the keyword set. In step S205, the first information would be displayed in a second user interface of the same application as the first user interface. For instance, if the received keyword set includes a person's name and a phone number, the second user interface would contain fields similar to the fields used by a phone directory to record a new contact, and the first information would contain information displayed in the second user interface. If the received keyword set is found to contain at least one of an event, a time, a place, and etc. . . . , the first information would be organized and contain information related to a calendar event. The second user interface could contain fields which would include what a person would expect when the person sets up a calendar event. The first information could also be organized in a form to contain information like a person taking notes to be displayed in the second user interface. After the first information has been displayed by the second user interface, the first information could be edit by the user of the mobile electronic device at any time in case there is an error. Also any blank field(s) in the second user interface could be manually entered by the user.

In step S206 the proposed mobile electronic device would store the first information into a non-volatile storage medium (e.g. 106) either before the phone conversation is terminated or after the phone conversation has been terminated. One advantage of storing the first information after the phone conversation has been terminated is that since the first information could be dynamically updated based on the contents of the phone conversation, by storing the first information after the phone conversation has been terminated, duplications of stored first information could be avoided.

According to an exemplary embodiment, the application for generating the reminder could be manually activated or deactivated by soft or hard buttons or switches or by configuring a setup menu. The activating of the application for generating the reminder could also be automatically enabled or disabled by a trigger. For example, upon receiving a phone call or a text message, the application could be automatically triggered to open. Also if a sensor (e.g. a proximity sensor of the sensor array 105) picks up a proximity detection, the application for generating the reminder might be temporarily disabled since it could mean that a user's face is close to the mobile electronic device and thus is not in a position to edit any information on the touch screen (e.g. 103) or the touch screen might be configured to automatically screen lock when a user's face is close to the touch screen. When a proximity sensor no longer detects any close object during a phone conversation, the application for generating the reminder could automatically be triggered to operate normally.

In an exemplary embodiment, assuming that the application for generating a reminder has been installed on the reciprocal end of a user device with whom a conversation is taking place, the first information displayed on the second user interface could be synchronized between both users. This could mean that when one user edits the first information, the change would automatically reflect on the other user device with whom the phone conversation is taking place.

In an exemplary embodiment, after a user activates an edit button on the second user interface of the application for generating a reminder, a third user interface which would be an interface to edit the first information would be opened. The third user interface, like the second user interface, could be displayed completely or partially overlapping the first user interface. Also in an alternative embodiment, after the edit button has been activated, another application could be opened such that the first information could automatically be imported to another device. For example, if the first information contains a contact person and a phone number, the first information could be imported to a phone directory application or a contact person list application which would also be opened automatically. If the first information contains information which resembles a calendar event, the first information could be imported to a calendar application, and a user could continue to edit the fields of the calendar event from the calendar application instead of from the application for generating a reminder list.

In an exemplary embodiment, after the first information has been displayed on a second user interface, a second information generated from a second keyword set could be displayed on another user interface which is different from the second user interface. The another user interface could be displayed with the second user interface side by side. For example, the first information displayed in a second user interface could contain information related to a contact person and the second information displayed in an another user interface could contain information related to an event.

FIG. 3~FIG. 6 would represent different embodiments of the proposed method used by the proposed mobile electronic device. The application for generating a reminder could be modified from the application of the incoming communication data source or could be an independent program. For example, if an incoming communication data source is a live phone call, the application for generating a reminder could be modified from an ordinary phone call application which currently exists in a smart phone or could be an independent application. If an incoming communication data source is an email, the application for generating a reminder could be modified from the email application or could be a stand alone application. For exemplary purposes, a phone call would be assumed for the embodiments of FIG. 3~FIG. 6.

Figure 3:
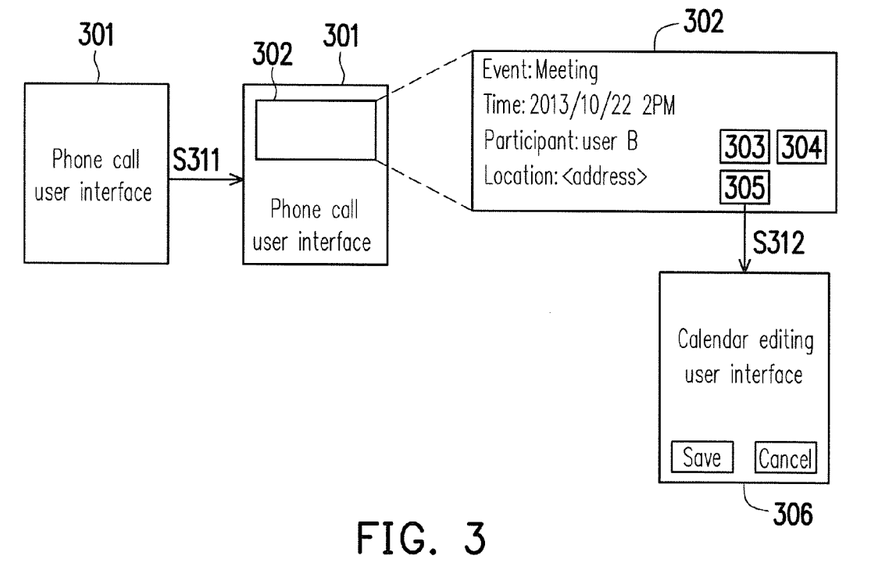
FIG. 3~FIG. 6 each illustrates a different exemplary embodiment of the reminder generating method.

First, a first user interface 301 of an application for generating a reminder would be opened. Assuming that the application for generating a reminder is a phone call application, the opening of the phone call application and the subsequent displaying of the first user interface 301 could be triggered by a phone call or could be manually opened by a user. Suppose that the first user interface 301 of user A has been triggered by an outgoing or an incoming phone call, then in step S311, the phone conversation would be recorded by the phone call application, and the voice data in the form of a digital bit stream would be transmitted to a voice analyzer. The voice analyzer would analyze the digital bit stream and generate a first keyword set. The first keyword set would then be analyzed by the application for generating a reminder to generate information to be displayed in another user interface.

In the embodiment of FIG. 3, during the phone conversation between user A and user B, the conversation has mentioned that a meeting would take place on Oct. 22, 2014 at 2 pm at a particular address, the voice analyzer would generate a first keyword set. The first keyword set would be analyzed by the application for generating a reminder to produce a first information which would contain the calendar event (e.g. meeting), the time, the date, the address, and the participant (e.g. user B), and the first information would be displayed in a second user interface 302 in appropriate fields as shown in FIG. 3. The second user interface 302 may contain any combination of three buttons including an establish button 305, a cancel button 303 to cancel the generation of this particular reminder from the first information, and a close button 304 to close the second user interface. The close button 304 could also take on a function to terminate the reminder generation feature entirely.

When a user activates the establish button 303, the first information would be saved. When a user activates the edit button 305, in step S312, a third user interface 306 or a calendar editing interface 306 could be opened. The third user interface 306 would be a user interface for editing the first information previously displayed by the second user interface. Since a typical voice recognition technology currently has a success rate around 70~80% on average, it would be conceivable that the first information would contain errors. Any time during or after a phone conversation has been terminated, a user could at any time edit the first information using the calendar editing interface 306. After the phone conversation has been terminated, a user could save the first information from the calendar editing user interface 306. It should be noted that the calendar editing user interface 306 could actually be another application such as a calendar application. In this case, the first information would be imported into the calendar application and be displayed and edited within a user interface of the calendar application.

For the embodiment of FIG. 3, before the phone conversation has been terminated, if conflicting information exists during the phone conversation, the latest information would be used as the first information would be updated accordingly. For instance, suppose that user A and user B speak about numerous potential meeting places as the finalized meeting place, the very last talked about meeting place would be used to update the first information as the second user interface would display the very last meeting place the conversation spoke about.

In an exemplary embodiment, suppose that the phone call has been terminated but the user B decides to call user A again, the phone call application could display the first information again in the second user interface 302 once again or in another user interface. This means that after user A or user B hangs up the phone conversation, the first information could be stored as a reminder. In user A's device for example, the reminder would be associated with user B such that when user B calls user A once again, the first information would be displayed in the screen of user A's device before user A answers the call.

Figure 4:
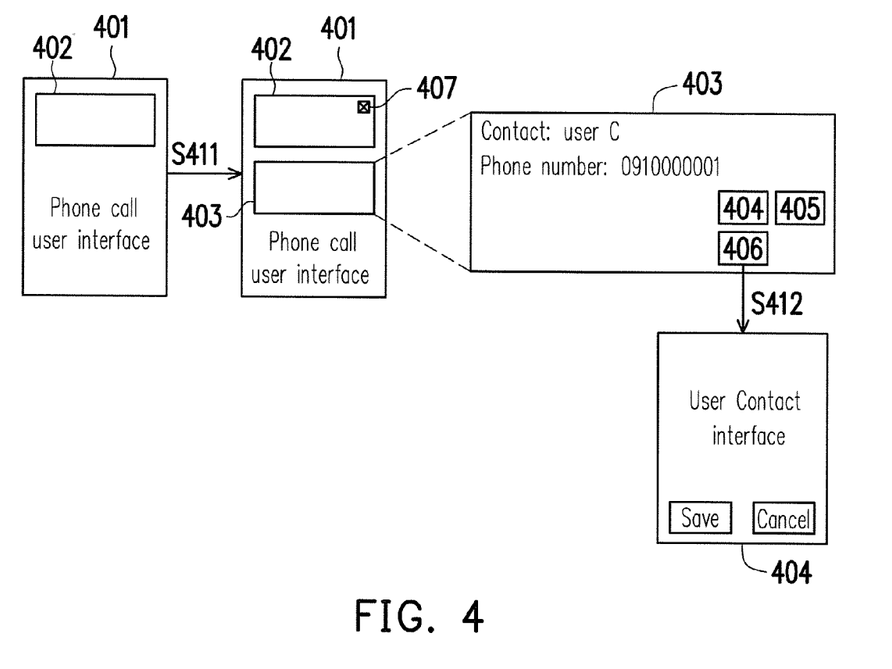

FIG. 4 would represent a different exemplary embodiment which could be a continuation of the embodiment represented by FIG. 3. Suppose that user A and user B are in the midst of a phone conversation, and the first interface 401 and the second interface 402 are already displayed by the display (e.g. 103), and the content of the second user interface 402 would be assumed to be identical to the second user interface 302 of the embodiment of FIG. 3 and a user could have the option to close the second user interface 402 using a close button 407. It step S411, the mobile electronic device receives through a wireless transceiver circuit (e.g. 102) a second keyword set, and the phone call application would then based on the information of the second keyword set generate a second information. For this particular embodiment, the second information could include information such as a contact person (e.g. user C) and a phone number. The second information could be displayed in a fifth user interface 403. From the fifth user interface, a user could store the second information using the establish button 404, could dismiss the fifth user interface by activating the cancel button 405, or could edit the second information by activating the edit button 406. When a user activates the edit button 406, in step S412, a contact person user interface 404 would be opened. A user could edit the second information (e.g. name and phone number) through the user contact interface 404 and save the second information when the user finished his editing. It should be noted that the second information could be generated from the same keyword set (e.g. the first keyword set) or be generated from the combination of the first keyword set and the second keyword set. In this way, a new contact (e.g. user C) in a person's phone directory could be established without involving user C in a conversation.

Figure 5:
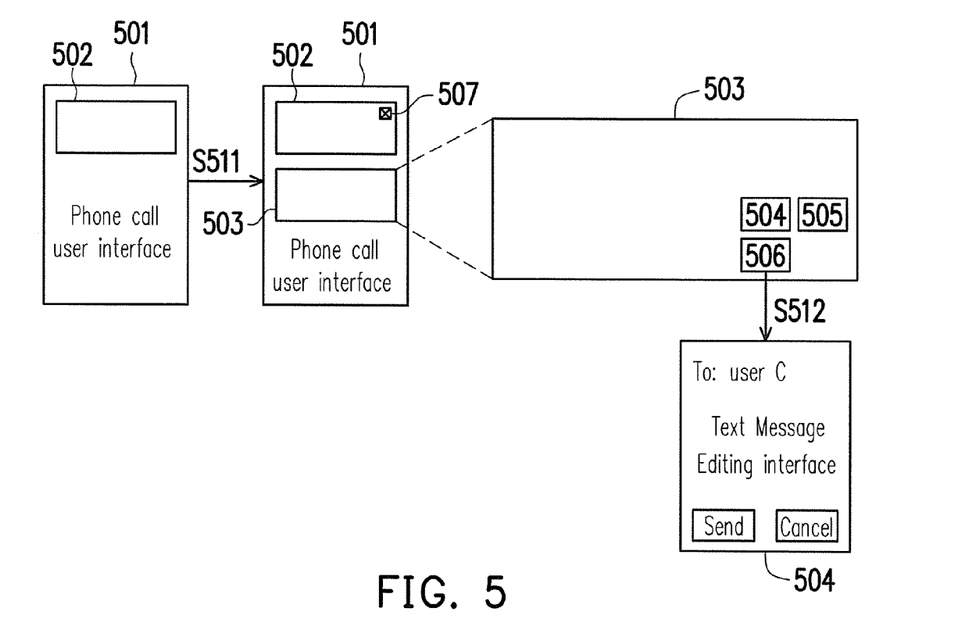

FIG. 5 would represent an alternative exemplary embodiment very similar to the exemplary embodiment of FIG. 4. Suppose that user A and user B are in the midst of a phone conversation, and the first interface 501 and the second interface 502 are already under display, and the content of the second user interface 502 would be assumed to be identical to the second user interface 402 of the embodiment of FIG. 4 and a user could have the option to close the second user interface 502 using a close button 507. It step S511, the mobile electronic device would receive a second keyword set, and the phone call application would then based on the information of the second keyword set generate a second information. For this particular embodiment, the second information would also assumed to be the same as the second information of the embodiment of FIG. 4 as the second information could include information such as a contact person (e.g. user C) and a phone number. The second information could be displayed in a fifth user interface 503. The fifth user interface 503 however may have different functional buttons. The user of the mobile electronic device could dial user C using the phone number displayed in the fifth user interface 503 by activating the dial button 504. The user could also dismiss the fifth user interface by activating the cancel button 505. The user could send a text message to user C based on the information displayed on the fifth user interface by activating a send text message button 506. When a user activates the send text message button 506, in step S512, a text message editing user interface 504 would be opened. A user could compose a text message using the text message editing user interface user interface 504 and send a text message when the user is finished by activating the send button or cancel the text message by activating the cancel button. It should be noted that it would apparent for an ordinary person skilled in the art that an embodiment could be generated based on the combination of embodiments of FIG. 4 and FIG. 5.

Figure 6:
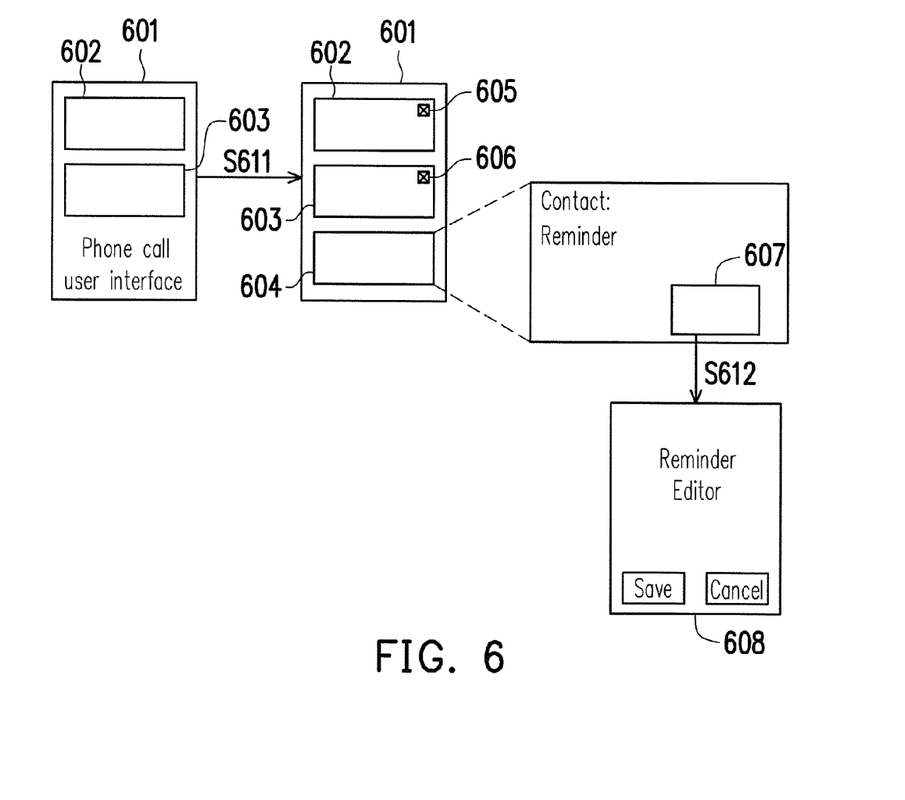

FIG. 6 would represent a different exemplary embodiment which could be a continuation of the embodiment represented by FIG. 4. Suppose that user A and user B are in the midst of a phone conversation, and the first interface 601 and the second interface 602 are under display, and the content of the second user interface 602 would be assumed to be identical to the second user interface 402 of the embodiment of FIG. 4 and a user could have the option to close the second user interface 602 using a close button 605 and to close the fifth user interface 603 using a close button 606. It step S611, the mobile electronic device receives a third keyword set, and the phone call application would then based on the information of the third keyword set or also based on any combination of the first keyword set, the second keyword set, and the third keyword set to generate the third information. For this particular embodiment, the third information would be displayed in a note taking window 604 and would contain any information the phone call application would consider to be useful or note taking worthy. The note taking window 604 would also include the information of the contact with whom the conversation takes place. Suppose that the user of the mobile electronic device is user A who is talking to user B, then information related to the identity of user B would be displayed in the note taking window. User A could save or discard the notes by activating a save or a discard button (not shown) within the note taking window 604.

User A could also activate an edit button 607 within the note taking window 604 to open a forth user interface 608 which is a reminder editing interface. From the fourth user interface 608, a user would be able to compose a note based on the third information collected from the phone conversation. The note composed using the fourth user interface 608 could be saved after user A activates the save button of the fourth user interface 608. When the note has been saved, the note would be associated with whom the conversation took place as user B would be associated with this note for this particular example. The purpose of the association is that the next time user A calls user B or user B calls user A, the note would once again be automatically displayed in either the note taking window 604 or the fourth user interface 608. For example, suppose that user B decides to call user A, the fourth user interface 608 would be displayed so that user A can have a recollection regarding the note that user A has composed previously before deciding whether to answer or decline the phone call.

Figure 7:
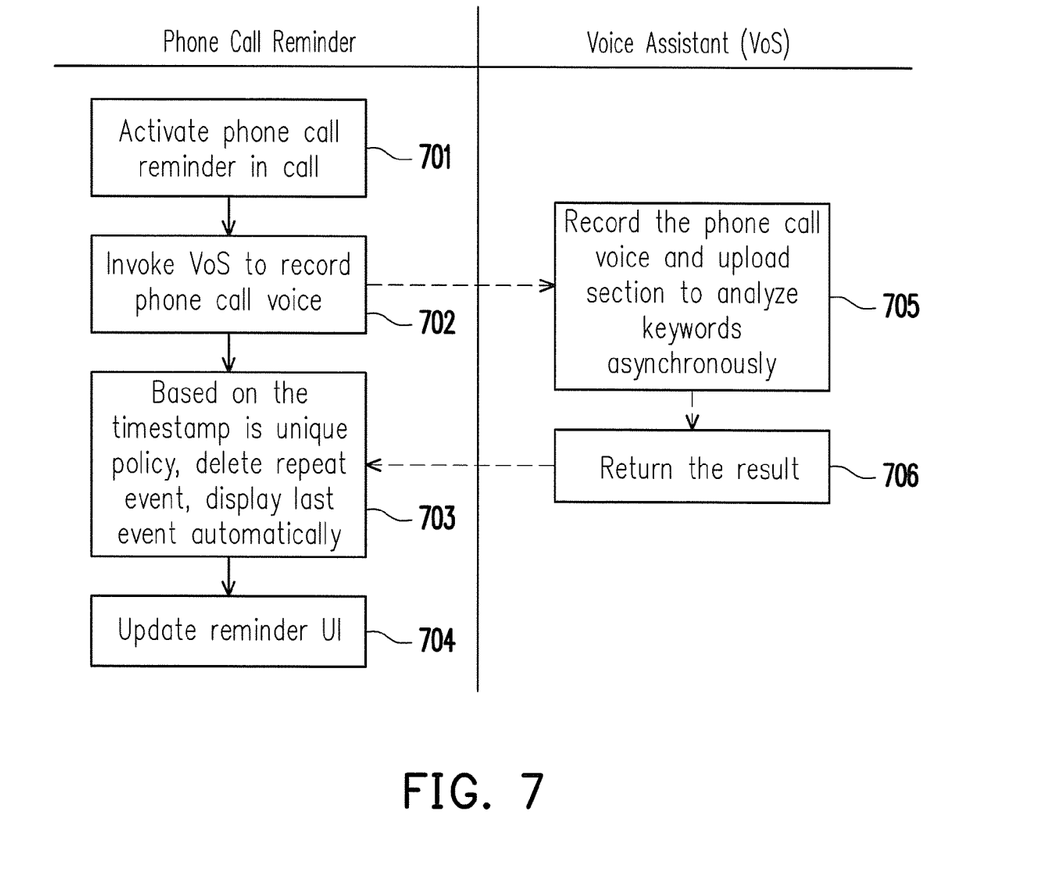
FIG. 7~FIG. 8 each illustrates a different exemplary embodiment of using a voice analyzer to generate a reminder from a phone conversation.
Figure 8:
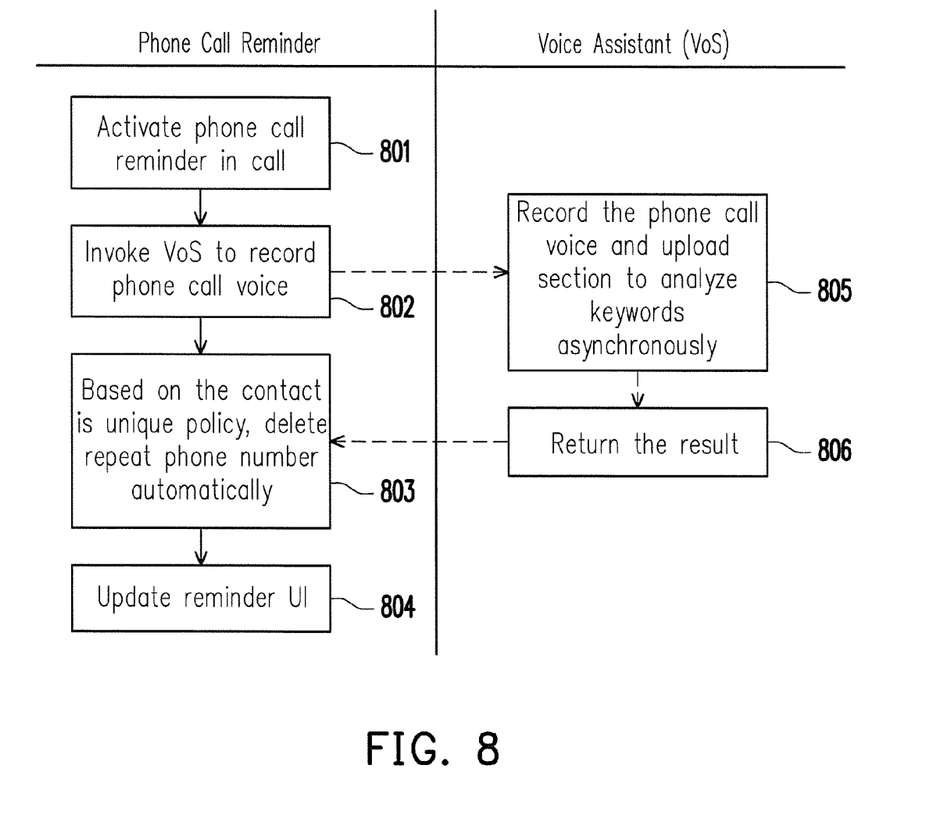

FIG. 7~FIG. 8 each illustrates a different exemplary embodiment of using a voice analyzer to generate a reminder from a phone conversation. In step S701, a reminder generating function would be activated manually or automatically before or during a phone conversation. As mentioned previously, a phone call could automatically activate the reminder generating function. However, in an alternative embodiment, a user could manually activate such feature from the phone call interface such as by touching a software button in the midst of a conversation. In step S702, the phone conversation would be converted into a digital bit stream which would be transmitted through a wireless interface (e.g. 102) to a voice assistant such as Voice Smart (VoS) in order to invoke VoS to record phone call voice. Alternatively, the digital bit stream could also be delivered to a voice analyzer which is native to the mobile electronic device to be stored and analyzed. Assuming that the phone conversation is to be analyzed by a non-local voice assistant, in step S705, the VoS would record the digital bit stream and analyze the digital bit stream asynchronously by looking for certain keywords. In step S706, the VoS would generate a keyword set to be returned to the mobile electronic device. In step S703, in response to receiving the keyword set from the VoS, the mobile electronic device would generate and organize reminder information (e.g. first information, second information, and etc. . . . ) for the purpose of saving the reminder information as various types of reminder information as shown in previous embodiments. However, as a phone conversation may repeat the same matter numerous times, repeating reminder information could be generated. For example, a conflicting meeting place could be mentioned within the same phone conversation. However, each keyword set would be associated with a unique time stamp such that the reminder information would also be gathered based on the latest information. In step S804, new user interfaces could be generated based on the latest keyword set received from the VoS and the previously opened user interfaces (first user interface, second user interface, and etc. . . . ) associated with the reminder generating functionality would be updated based on the latest keyword set.

FIG. 8 illustrates another exemplary embodiment of using a voice analyzer to generate a reminder from a phone conversation. Steps S801~S806 would be the same as step S701~S706 except for S803. In step S803, based on each contact is unique policy, repeating phone numbers associated with the same contact would be deleted automatically. This would mean that if two different phone numbers are mentioned twice and both phone numbers are associated with contact C, then the contact person user interface would be automatically updated based on the last phone number uttered within the phone conversation associated with contact C.

In view of the aforementioned descriptions, the present disclosure is suitable for being used by a mobile electronic device to automatically extract and organize useful information directly from a communication input source to be recorded and stored in the mobile electronic device such that the user of the device does not have to manually take notes or manually activate another application to enter information related to the communication input source.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of" "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A reminder generating method applicable to a mobile electronic device, and the method comprising:
    displaying a first user interface of an application on a display of the mobile electronic device;
    obtaining a data source by using the application, wherein the data source is a live voice conversation;
    establishing a first voice conversation after displaying the first user interface which is a voice conversation interface;
    receiving a keyword set extracted from the data source;
    analyzing the keyword set to generate a first information based on the keyword set and displaying the first information in a second user interface of the application; and
    storing the first information,
    updating the first information with another information which is conflicting with the first information only if the another information conflicting with the first information exists during the first voice conversation before the first voice conversation is terminated, wherein a time stamp of the another information is later than the first information.

2. The method of claim 1 further comprising:
    activating an editing button on the second user interface; and
    editing the first information on a third user interface before the first info illation is stored.

3. The method of claim 1 further comprising:
    establishing a second voice conversation with the same subscriber as the first voice conversation; and
    in response to the second voice conversation being established, displaying a fourth user interface comprising the first information.

4. The method of claim 1 further comprising:
    receiving another keyword set extracted from the data stream;

analyzing the another keyword set to generate within the first user interface a fifth user interface comprising a second information based on the another keyword; and
storing the second information.

5. The method of claim 1, wherein if the second user interface is a contact person user interface, further comprising:
opening a text message editing user interface in response to activating a software button;
sending a text message displayed on the text message editing user interface.

6. The method of claim 5 further comprising:
making a phone call from the contact person user interface.

7. The method of claim 1, wherein in response to obtaining a data source by using the first application, further comprising:
converting the data source into a bit stream;
transmitting the bit stream through a wireless interface; and
receiving the keyword set from the wireless interface in response to transmitting the bit stream.

8. The method of claim 1, wherein in response to obtaining a data source by using the application, further comprising:
converting the data source into a bit stream;
transmitting the bit stream to a voice analyzing module which is native to the mobile electronic device; and
receiving the keyword set from the voice analyzing module in response to transmitting the bit stream.

9. The method of claim 1, wherein the data source is one of a recorded phone conversation, a live phone conversation, a text message, an instant message, an email, a social network message, and a self created note.

10. A mobile electronic device comprising a display, a storage medium, and a processor coupled to the display and the storage medium and is configured for:
displaying a first user interface of an application on a display of the mobile electronic device;
obtaining a data source by using the application displayed on the display, wherein the data source is a live voice conversation;
establishing through a wireless transceiver of the mobile electronic device a first voice conversation after displaying the voice conversation interface;
receiving a keyword set extracted from the data source;
analyzing the keyword set to generate a first information based on the keyword set and displaying the first information in a second user interface of the application; and
storing the first information in the storage medium,
updating the first information with another information which is conflicting with the first information only if the another information conflicting with the first information exists during the first voice conversation before the first voice conversation is terminated, wherein a time stamp of the another information is later than the first information.

11. The device of claim 10, wherein the processor is further configured for:
displaying a third user interface displayed on the display in response to activating a software button of the second user interface; and
editing the first information on the third user interface displayed on the display before the first information is stored.

12. The device of claim 11, wherein the processor is further configured for:

establishing through the wireless transceiver a second voice conversation with the same subscriber as the first voice conversation; and
in response to the second voice conversation being established, displaying in a fourth user interface comprising the first information on the display.

13. The device of claim 10 is further configured for:
receiving another keyword set extracted from the data stream;
analyzing the another keyword set to generate within the first user interface a fifth user interface comprising a second information based on the another keyword set; and
storing the second information in the storage medium.

14. The device of claim 10, wherein if the second user interface is a contact person user interface, the processor is further configured for:
opening a text message editing user interface in response to activating a software button; and
sending a text message through the wireless transceiver displayed on the text message editing user interface.

15. The device of claim 14 is further configured for:
making a phone call through the wireless transceiver from the contact person user interface displayed on the display.

16. The device of claim 10, wherein in response to obtaining a data source by using the application displayed on the display, the processor is further configured for:
converting the data source into a bit stream;
transmitting through the wireless transceiver the bit stream; and
receiving the keyword set from the wireless transceiver in response to transmitting the bit stream.

17. The device of claim 10, wherein the processor further comprises a voice analyzing module, and in response to the processor obtaining a data source by using the application displayed on the display, the processor is further configured for:
converting the data source into a bit stream;
transmitting the bit stream to a voice analyzing module; and
receiving the keyword set from the voice analyzing module in response to transmitting the bit stream.

18. A non-transitory storage medium configured to store a plurality of computer readable programming codes to be loaded into a mobile electronic device to execute functions comprising:
displaying a first user interface of an application on a display of the mobile electronic device;
obtaining a data source by using the application, wherein the data source is a live voice conversation;
establishing a first voice conversation after displaying the first user interface which is a voice conversation interface;
receiving a keyword set extracted from the data source;
analyzing the keyword set to generate a first information based on the keyword set and displaying the first information in a second user interface of the application; and
storing the first information,
updating the first information with another information which is conflicting with the first information only if the another information conflicting with the first information exists during the first voice conversation before the first voice conversation is terminated.

* * * * *